(12) United States Patent
Yoon et al.

(10) Patent No.: US 10,893,235 B2
(45) Date of Patent: Jan. 12, 2021

(54) CONFERENCING APPARATUS AND METHOD FOR SWITCHING ACCESS TERMINAL THEREOF

(71) Applicant: SAMSUNG SDS CO., LTD., Seoul (KR)

(72) Inventors: Hee-Tae Yoon, Seoul (KR); Seong-Joong Chang, Seoul (KR); Do-Hyung Im, Seoul (KR); Jun-Ho Kang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 16/173,285

(22) Filed: Oct. 29, 2018

(65) Prior Publication Data

US 2019/0132552 A1 May 2, 2019

(30) Foreign Application Priority Data

Oct. 30, 2017 (KR) .......................... 10-2017-0142705

(51) Int. Cl.
*H04N 7/15* (2006.01)
*H04W 12/08* (2009.01)
(Continued)

(52) U.S. Cl.
CPC ......... *H04N 7/152* (2013.01); *G06F 16/1774* (2019.01); *G06F 21/10* (2013.01);
(Continued)

(58) Field of Classification Search
USPC ................................................... 348/14.09
See application file for complete search history.

(56) References Cited

U.S. PATENT DOCUMENTS 8,769,289 B1\* 7/2014 Kronrod ............... H04L 9/3247
 713/171
9,819,665 B1\* 11/2017 Machani ............... H04L 63/083
(Continued)

FOREIGN PATENT DOCUMENTS

CN 101635822 A 1/2010
CN 106209399 A 12/2016
(Continued)

OTHER PUBLICATIONS

Communication dated Sep. 3, 2020, from the State Intellectual Property Office of People's Republic of China in counterpart Application No. 201811274578.0.
Communication dated Nov. 18, 2020, issued by the Korean Intellectual Property Office in corresponding Korean Application No. 10-2017-0142705.

*Primary Examiner* — Amal S Zenati
(74) *Attorney, Agent, or Firm* — Sughrue Mion, PLLC

(57) ABSTRACT

A conferencing apparatus and a method for switching an access terminal therein are provided. The conferencing apparatus according to one embodiment of the present disclosure includes: a conference information management module configured to generate mapping information for terminal identification information of a first terminal and access information of a conference participant who is accessing a conference through the first terminal; and an access switch module configured to provide a token corresponding to the mapping information to the first terminal according to an access terminal switch request from the first terminal and, when the token is received from a second terminal, switch a terminal of the conference participant from the first terminal to the second terminal according to validity of the received token.

10 Claims, 5 Drawing Sheets

(51) Int. Cl.
*H04L 9/32* (2006.01)
*H04W 88/02* (2009.01)
*H04N 7/14* (2006.01)
*G06F 21/10* (2013.01)
*G06F 16/176* (2019.01)
*H04L 29/06* (2006.01)
*G06F 21/33* (2013.01)

(52) U.S. Cl.
CPC .......... *G06F 21/335* (2013.01); *H04L 9/3213* (2013.01); *H04L 63/0807* (2013.01); *H04N 7/147* (2013.01); *H04W 12/08* (2013.01); *H04W 88/02* (2013.01)

(56) References Cited

U.S. PATENT DOCUMENTS

| | | | |
|---|---|---|---|
| 2006/0047750 A1 | 3/2006 | Schmitt et al. | |
| 2006/0077957 A1* | 4/2006 | Reddy | H04M 3/42229 370/352 |
| 2009/0220066 A1* | 9/2009 | Shaffer | H04M 3/56 379/204.01 |

FOREIGN PATENT DOCUMENTS

| | | |
|---|---|---|
| CN | 106470326 A | 3/2017 |
| JP | 2016-018529 A | 2/2016 |

* cited by examiner of Korean Patent Application No. 10-2017-0142705, filed on Oct. 30, 2017, in the Korean Intellectual Property Office, the entire disclosure of which is incorporated herein by reference for all purposes.

BACKGROUND

1. Field

The following description relates to conferencing technology.

2. Description of Related Art

A multi-party conferencing system is a remote communication system in which two or more users access a virtual conference room and conduct a conferences simultaneously using voice and video. With the conferencing system, people at multiple locations can conveniently collaborate.

A user who intends to attend a conference accesses a conference server by using various types of communication devices, such as a personal computer, a mobile device, a wearable device, and the like. In this case, in order for a user connected to the conference server using a specific communication device to change the access terminal to another communication device, authentication information (ID/password and the like) of the user or conference information (PIN code and the like) are required to be re-input.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide a technical means for an attendee participating in a conference to easily switch a terminal connected to the conference to another terminal.

In one general aspect, there is provided a conference server including: a conference information management module configured to generate mapping information for terminal identification information of a first terminal and access information of a conference participant who is accessing a conference through the first terminal; and an access switch module configured to provide a token corresponding to the mapping information to the first terminal according to an access terminal switch request from the first terminal and, when the token is received from a second terminal, switch a terminal of the conference participant from the first terminal to the second terminal according to validity of the received token.

The access switch module may include the token in an access link in which the token is included to the conference server and provides the access link to the first terminal.

The access switch module may receive the token from the second terminal as the second terminal that has received the access link from the first terminal selects the access link.

The token may include a timeout period.

The access switch module may determine that the received token is valid when reception time of the received token is within the timeout period.

The token may include identification information of an access switch target terminal received from the first terminal.

The access switch module may determine that the received token is valid when the identification information of the access switch target terminal included in the received token is identical to identification information of the second terminal.

The access switch module may switch a terminal of the conference participant from the first terminal to the second terminal by updating terminal identification information in the mapping information corresponding to the token to identification information of the second terminal.

In another general aspect, there is provided a method for switching a terminal of a conference participant, who is connected to a conference server using a first terminal, to a second terminal, the method including: generating mapping information by mapping terminal identification information of the first terminal and access information of the conference participant; generating a token corresponding to the mapping information according to an access terminal switch request from the first terminal; transmitting the token to the first terminal; when a token is received from the second terminal, verifying validity of the received token; and switching the terminal of the conference participant to the second terminal according to validity of the received token.

The transmitting of the token to the first terminal may include including the token in an access link to the conference server and providing the access link in which the token is included to the first terminal.

The verifying validity of the received token may include receiving the token from the second terminal as the second terminal which has received the access link from the first terminal selects the access link.

The token may include a timeout period.

The verifying validity of the received token may further include determining whether reception time of the received token is within the timeout period.

The token may include identification information of an access switch target terminal received from the first terminal.

The verifying validity of the received token may further include determining whether the identification information of the access switch target terminal included in the received token is identical to identification information of the second terminal.

The switching of the terminal of the conference participant to the second terminal may further include updating terminal identification information in the mapping information corresponding to the token to identification information of the second terminal.

Other features and aspects will be apparent from the following detailed description, the drawings, and the claims.

Figure 1:
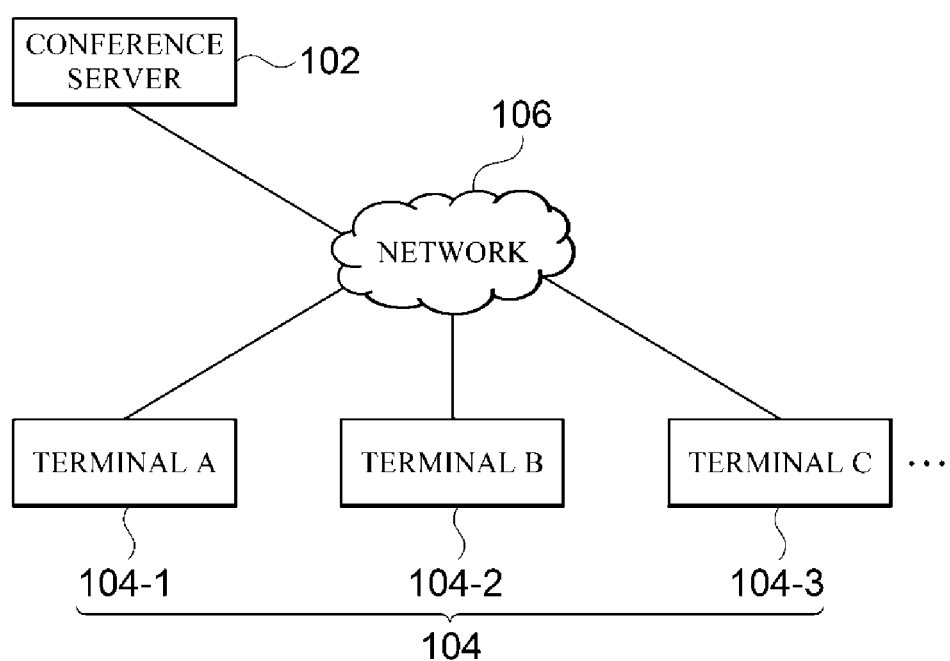
FIG. 1 is a block diagram illustrating a conferencing system 100 according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a block diagram illustrating a conferencing system 100 according to one embodiment of the present disclosure. As shown in FIG. 1, the conferencing system 100 according to one embodiment of the present disclosure includes a conference server 102 and a plurality of conference participant terminals 104.

The conference server 102 is a server for providing a conference service between the plurality of conference participant terminals 104. In one embodiment, the conference server 102 may relay one or more of text, audio, and video data between two or more conference participant terminals 104 to enable the plurality of participant terminals 104 to conduct text messaging, an audio conference, or a video conference in a virtual conference room.

Each of the conference participant terminals 104 is a terminal used by a user (a conference participant) who accesses the conference server 102 and takes part in a conference. In the disclosed embodiments, each of the conference participant terminals 104 may include any type of communication device, such as a desktop computer, a notebook computer, a tablet computer, a smartphone, a wearable device, etc., which is able to receive a conference service. Although in the illustrated embodiment, three terminals including terminal A 104-1, terminal B 104-2, and terminal C 104-3 access the conference server 102 and conduct the conference, it should be noted that the embodiments of the present disclosure is not limited to the specific number of terminals.

Meanwhile, the conference server 102 and the plurality of conference participant terminals 104 may transmit and receive data therebetween over a communication network 106. In some embodiments, the communication network 106 may include the Internet, one or more local area networks, wide area networks, cellular networks, mobile networks, and other types of networks, or a combination thereof.

Figure 2:
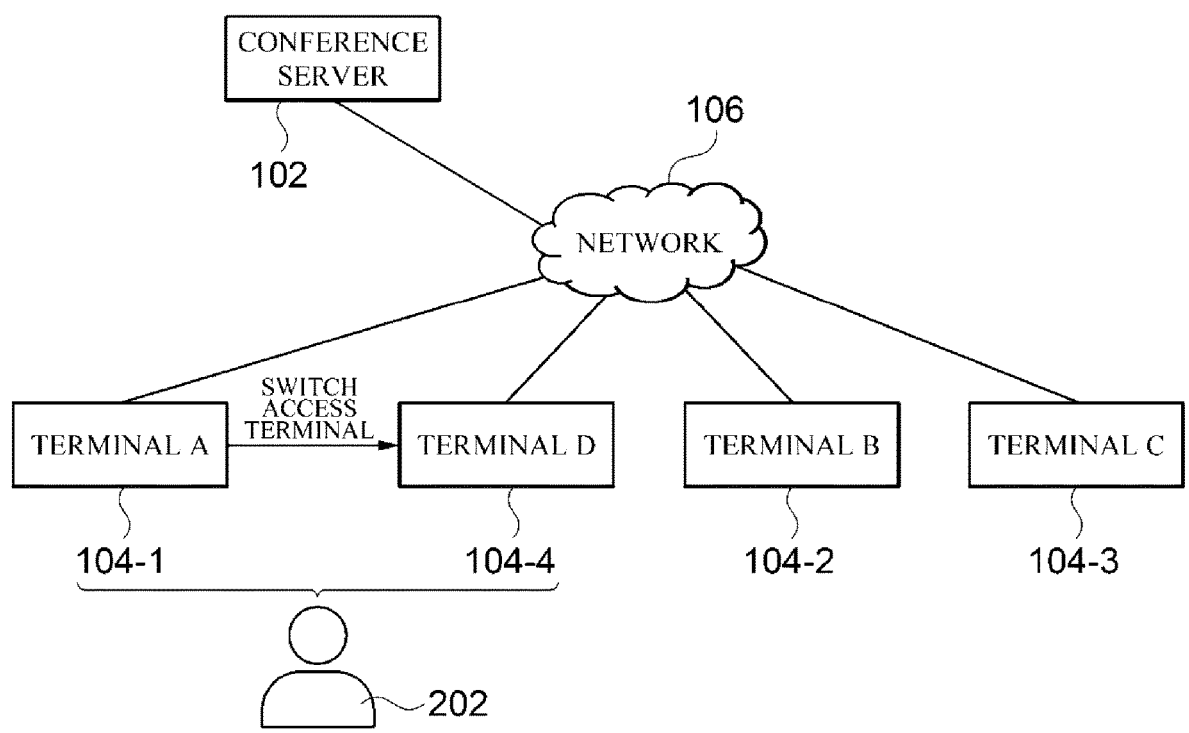
FIG. 2 is a diagram for describing an example in which a conference participant changes an access terminal in a conferencing system according to one embodiment of the present disclosure.

FIG. 2 is a diagram for describing an example in which a conference participant changes an access terminal in a conferencing system 100 according to one embodiment of the present disclosure. As shown in FIG. 2, a conference participant 202 who is taking part in a conference using, for example, terminal A 104-1, may switch a conference access terminal from terminal A 104-1 to terminal D 104-4. For example, a conference participant who is participating in a conference using a mobile device may switch the conference access terminal to a desktop computer.

The conference participant 202 may transmit an access terminal switch request to a conference server 102 in order to switch a conference access terminal from terminal A 104-1 to terminal D 104-4. Then, the conference server 102 generates an access link which includes a token for changing a conference access terminal and provides the access link to terminal A 104-1, and the conference participant 202 transmits the access link from terminal A 104-1 to terminal D 104-4 which is to newly access the conference. Thereafter, the conference participant 202 accesses the conference server 102 by selecting the access link at terminal D 104-4, and the conference server 102 verifies validity of the token received from terminal D 104-4 to switch the conference access terminal of the conference participant 202 from terminal A 104-1 to terminal D 104-4.

Figure 3:
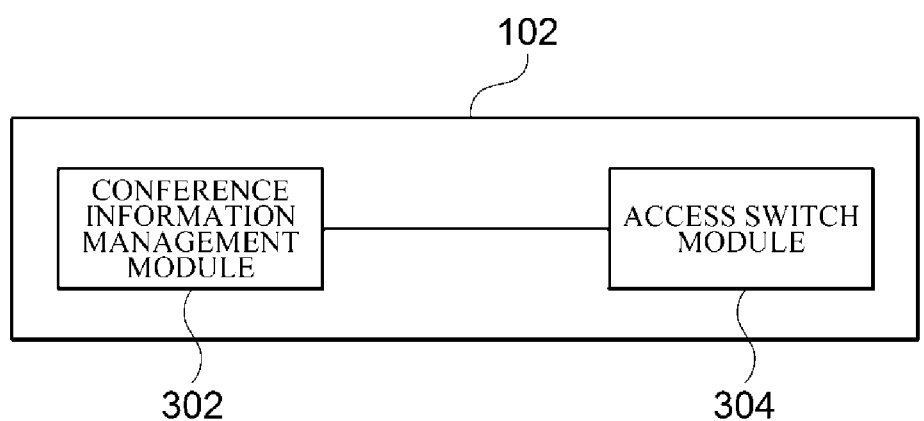
FIG. 3 is a block diagram for describing a conference server according to one embodiment of the present disclosure.

FIG. 3 is a block diagram for describing a conference server 102 according to one embodiment of the present disclosure. As shown in FIG. 3, the conference server 102 according to one embodiment of the present disclosure includes a conference information management module 302 and an access switch module 304.

The conference information management module 302 generates mapping information for terminal identification information of each terminal connected to a conference and access information of each conference participant who takes part in a conference through the terminal. For example, the conference information management module 302 may generate the mapping information by mapping terminal identification information of terminal A 104-1 to access information of the conference participant 202 who uses terminal A 104-1. In one embodiment, the terminal identification information may include any type of information for identifying each terminal in a conference, such as a serial number, an IP address, a MAC address, and the like of the terminal. In addition, the access information of the conference participant may be information for distinguishing the conference participant from other conference participants in the conference, such as user authentication information of the conference participant, for example, authentication information through an ID/password, PIN code information input by the conference participant at the time of accessing the conference, or title information which is to be used in the conference and is input by the conference participant. For another example, the access information of the conference participant may be session information which is generated when the conference participant accesses the conference server 102.

The access switch module 304 receives an access terminal switch request from a particular terminal, for example, terminal A 104-1 in the embodiment of FIG. 2, among terminals 104 connected to the conference, and accordingly, generates a token corresponding to mapping information of terminal A 104-1 and transmits the token to terminal A 104-1. In one embodiment, the access switch module 304 may include the token in an access link to the conference server 102 and transmit the access link to terminal A 104-1. For example, the access link may have the form of a general Web URL, and the token may be included in the URL in the form of a parameter added to the URL. The access link may be transmitted to terminal A 104-1 in the form of a short message service (SMS), an e-mail, a message push, or the like.

Then, terminal A 104-1 transmits the access link including the token to terminal D 104-4, which is a new access terminal. For example, terminal A 104-1 may transmit the access link to terminal D 104-1 in the form of an SMS, an e-mail, a message push, or the like. According to an embodiment, the access switch module 304 may directly transmit the access link to terminal D 104-4 rather than terminal A 104-1. In this case, terminal A 104-1 may provide the access switch module 304 in advance with information (e.g., a phone number of terminal D 104-4) required to provide the access link to terminal D 104-4.

Terminal D 104-4 which has received the access link selects the access link to access the conference server 102. In this process, terminal D 104-4 forwards the token included in the access link to the conference server 102. The access switch module 304 which has received the token verifies validity of the received token. In this case, the validity verification process of the token may include a process of determining whether the received token is identical to a token previously transmitted to terminal A 104-1.

In addition, in one embodiment, when the access switch module 304 generates the token, the access switch module 304 may set a timeout period in the token, and in this case, the validity verification process of the token may further include a process of determining whether reception time of the received token is within the timeout period. That is, the access switch module 304 may determine that the token is valid only when the reception time of the token received from terminal D 104-4 is within the timeout period.

In addition, according to an embodiment, the access switch module 304 may collect identification information (a phone number of a terminal, an IP address, etc.) of an access switch target terminal from terminal A 104-1 in advance when the access switch module 304 generates the token. In this case, the access switch module 304 may collect identification information of terminal D 104-4 when receiving the token from terminal D 104-4, compare the collected identification information with the identification information received from terminal A 104-1, and determine that the token is valid only when the two pieces of identification information match. As such, when the information of the access switch target terminal is collected together with the token, it is possible to prevent an attempt to switch an access terminal by a terminal of a malicious third party. For example, the access switch module 304 may encrypt the token using the identification information of terminal D 104-4 received from terminal A 104-1 as a key and then the encrypted token to terminal A 104-4. Then, the access switch module 304 may receive the encrypted token and the identification information of terminal D 104-4 from terminal D 104-4 and verify validity of the token by decrypting the encrypted token using the received information.

When the token is validated through the above processes, the access switch module 304 switches the conference access terminal of the conference participant 202 connected to the conference from terminal A 104-1 to terminal D 104-4. Specifically, the access switch module 304 may switch the conference access terminal of the conference participant from terminal A 104-1 to terminal D 104-4 by updating the terminal identification information in the mapping information corresponding to the token from the identification information of terminal A 104-1 to that of terminal D 104-4. Additionally, in this case, the access switch module 304 may terminate a connection with terminal A 104-1.

Figure 4:
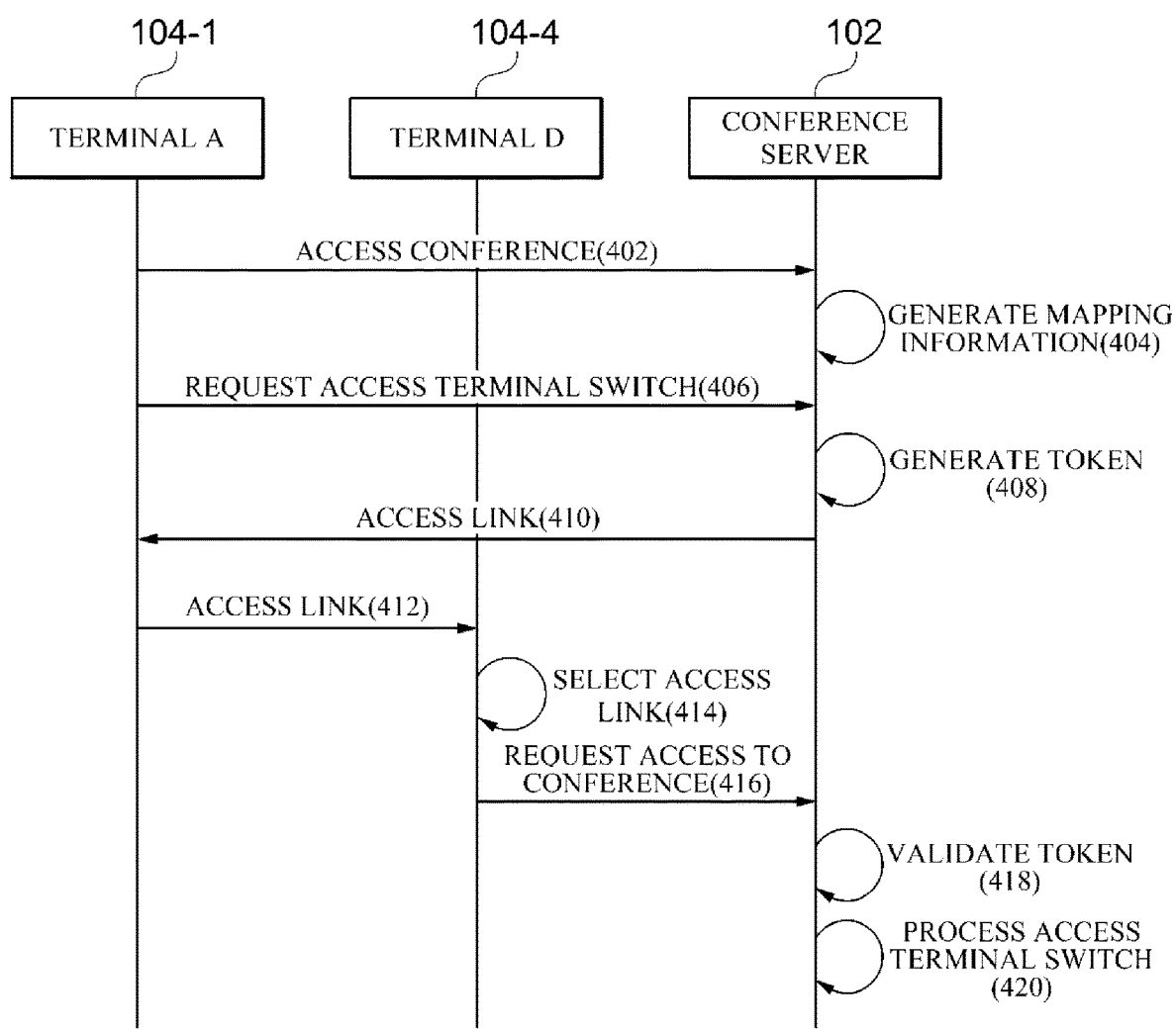
FIG. 4 is a flowchart for describing a method for switching a conference access terminal according to one embodiment of the present disclosure.

FIG. 4 is a flowchart for describing a method 400 of switching a conference access terminal according to one embodiment of the present disclosure. The method shown in FIG. 4 may be performed by, for example, the above-described conference server 102. In the illustrated flowchart, the method is described as being divided into a plurality of operations. However, it should be noted that at least some of the operations may be performed in different order or may be combined into fewer operations or further divided into more operations. In addition, some of the operations may be omitted, or one or more extra operations, which are not illustrated, may be added to the flowchart and be performed.

In operation 402, the conference server 102 processes a conference access of terminal A 104-1.

In operation 404, the conference information management module 302 of the conference server 102 generates mapping information for terminal identification information of terminal A 104-1, which accesses the conference, and access information of a conference participant 202 who takes part in the conference using the corresponding terminal.

In operation 406, the access switch module 304 of the conference server 102 receives an access terminal switch request from terminal A 104-1.

In operation 408, the access switch module 304 generates a token that corresponds to the mapping information of terminal A 104-1.

In operation 410, the access switch module 304 transmits the generated token to terminal A 104-1. As described above, the access switch module 304 may include the token in an access link to the conference server 102 and transmit the access link to terminal A 104-1. The access link may be transmitted in the form of an SMS, an e-mail, a message push, or the like.

In operation 412, terminal A 104-1 transmits the access link including the token to terminal D 104-4, which is a new access terminal. For example, terminal A 104-1 may transmit the access link to terminal D 104-4 in the form of an SMS, an e-mail, a message push, or the like.

In operation 414, terminal D 104-4, which has received the access link, selects the access link, and in operation 416, terminal D 104-4 requests an access to the conference server 102. In this process, terminal D 104-4 forwards the token included in the access link to the conference server 102.

In operation 418, the access switch module 304 verifies validity of the received token. The details related to the validity verification of the token have been described in detail, and thus the redundant description will be omitted.

When the validity of the received token is verified, the access switch module 304 switches the conference access terminal of the conference participant 202, who accesses the conference, from terminal A 104-1 to terminal D 104-4.

Figure 5:
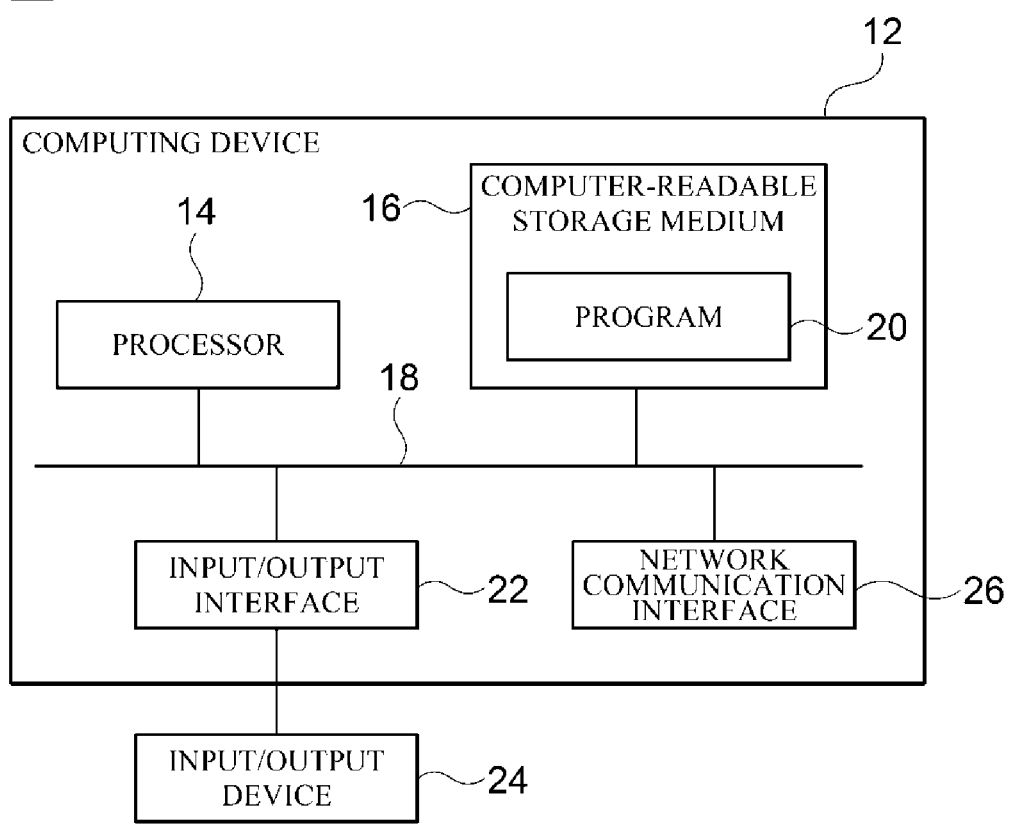
FIG. 5 is a block diagram for describing an example of a computing environment 10 including a computing device suitable to be used in exemplary embodiments.

FIG. 5 is a block diagram for describing an example of a computing environment 10 including a computing device suitable to be used in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be a conference server 102. In addition, the computing device may be a conference participant terminal 104. The computing device 12 includes at least one processor 14, a computer-readable storage medium 16, and a communication bus 18. The processor 14 may cause the computing device 12 to operate according to the aforementioned exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the illustrative embodiment.

The computer-readable storage medium 16 is configured to store computer executable commands and program codes, program data and/or information in other suitable forms. The programs stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, a participant who is taking part in a conference is able to easily switch a terminal connected to the conference to another terminal only by selecting an access link provided from a conference server. Therefore, according to the embodiments of the present disclosure, the conference participant is allowed to utilize various types of terminals as necessary, and thereby it is possible to increase convenience for the conference.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A conference server comprising:
a conference information management module configured to generate mapping information for terminal identification information of a first terminal and access information of a conference participant who is accessing a conference through the first terminal; and
an access switch module configured to provide a token corresponding to the mapping information to the first terminal according to an access terminal switch request from the first terminal and, when the token is received from a second terminal, switch a terminal of the conference participant from the first terminal to the second terminal according to validity of the received token,
wherein the token includes identification information of an access switch target terminal received from the first terminal,
wherein the access switch module determines that the received token is valid when the identification information of the access switch target terminal included in the received token is identical to identification information of the second terminal, and
wherein the access switch module includes the token in an access link to the conference server and provides the access link in which the token is included to the first terminal.

2. The conference server of claim 1, wherein the access switch module receives the token from the second terminal as the second terminal that has received the access link from the first terminal selects the access link.

3. The conference server of claim 1, wherein the token includes a timeout period.

4. The conference server of claim 3, wherein the access switch module determines that the received token is valid when reception time of the received token is within the timeout period.

5. The conference server of claim 1, wherein the access switch module switches a terminal of the conference participant from the first terminal to the second terminal by updating terminal identification information in the mapping information corresponding to the token to identification information of the second terminal.

6. A method for switching a terminal of a conference participant, who is connected to a conference server using a first terminal, to a second terminal, the method comprising:
generating mapping information by mapping terminal identification information of the first terminal and access information of the conference participant;
generating a token corresponding to the mapping information according to an access terminal switch request from the first terminal;
transmitting the token to the first terminal;
when a token is received from the second terminal, verifying validity of the received token; and
switching the terminal of the conference participant to the second terminal according to validity of the received token,
wherein the token includes identification information of an access switch target terminal received from the first terminal,
wherein the verifying validity of the received token further comprises determining whether the identification information of the access switch target terminal included in the received token is identical to identification information of the second terminal, and
wherein the transmitting of the token to the first terminal comprises:
including the token in an access link to the conference server; and
providing the access link in which the token is included to the first terminal.

7. The method of claim 6, wherein the verifying validity of the received token comprises receiving the token from the second terminal as the second terminal which has received the access link from the first terminal selects the access link.

8. The method of claim 6, wherein the token includes a timeout period.

9. The method of claim 8, wherein the verifying validity of the received token further comprises determining whether reception time of the received token received is within the timeout period.

10. The method of claim 6, wherein the switching of the terminal of the conference participant to the second terminal further comprises updating terminal identification information in the mapping information corresponding to the token to identification information of the second terminal.

* * * * *